(12) United States Patent
Franz et al.

(10) Patent No.: US 8,668,757 B2
(45) Date of Patent: Mar. 11, 2014

(54) METHOD FOR PRODUCING A CERAMIC FILTER ELEMENT AND FILTER ELEMENT

(75) Inventors: Andreas Franz, Ludwigsburg (DE); Jochen Linhart, Schwaikheim (DE); Holger Findeisen, Marbach (DE); Kathrin Fischer, Kammeltal (DE); Sabine Otterbach, Bietigheim-Bissingen (DE); Kathrin Lichtenwalter, Gerlingen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/204,313

(22) Filed: Aug. 5, 2011

(65) Prior Publication Data

US 2011/0283670 A1 Nov. 24, 2011

Related U.S. Application Data

(63) Continuation of application No. PCT/EP2010/051636, filed on Feb. 10, 2010, and a continuation-in-part of application No. 13/033,979, filed on Feb. 24, 2011, and a continuation-in-part of application No. 12/530,153, filed on Jan. 22, 2010.

(30) Foreign Application Priority Data

Feb. 10, 2009 (DE) .................. 10 2009 008 296

(51) Int. Cl.
*B01D 24/00* (2006.01)
*B01D 39/14* (2006.01)
*B01D 39/06* (2006.01)
*B01D 50/00* (2006.01)
*F01D 3/00* (2006.01)

(52) U.S. Cl.
USPC ............... 55/523; 55/522; 55/524; 422/169; 422/170; 422/171; 422/172; 422/177; 422/178; 422/179; 422/180; 422/181; 422/182; 60/297

(58) Field of Classification Search
USPC ............ 55/522–524; 422/169–172, 177–182; 60/297
See application file for complete search history.

(56) References Cited

U.S. PATENT DOCUMENTS

| | | | | |
|---|---|---|---|---|
| 4,528,008 A * | 7/1985 | Takagi et al. | | 55/485 |
| 5,820,646 A * | 10/1998 | Gillingham et al. | | 55/488 |
| 5,888,262 A * | 3/1999 | Kahler | | 55/497 |
| 6,534,021 B1 * | 3/2003 | Maus | | 422/180 |
| 6,673,414 B2 * | 1/2004 | Ketcham et al. | | 428/116 |
| 6,764,743 B2 * | 7/2004 | Kato et al. | | 428/118 |
| 7,468,166 B2 * | 12/2008 | Gaiser | | 422/180 |
| 2003/0014856 A1 | 1/2003 | Yamaguchi | | |
| 2003/0072694 A1 * | 4/2003 | Hodgson et al. | | 422/180 |
| 2004/0177600 A1 * | 9/2004 | Ichikawa et al. | | 55/523 |
| 2004/0208803 A1 * | 10/2004 | Bruck | | 422/180 |
| 2007/0186911 A1 * | 8/2007 | Gerlach et al. | | 123/556 |
| 2010/0129271 A1 * | 5/2010 | Micke et al. | | 422/180 |
| 2011/0107732 A1 * | 5/2011 | Schildermans et al. | | 55/482.1 |

FOREIGN PATENT DOCUMENTS

| | | |
|---|---|---|
| DE | 102007011569 A1 | 9/2008 |
| EP | 1256369 A2 | 11/2002 |
| EP | 1930060 A1 | 6/2008 |

OTHER PUBLICATIONS

International Search Report of PCT/EP2010/051636.

\* cited by examiner

*Primary Examiner* — Amber Orlando
(74) *Attorney, Agent, or Firm* — James Hasselbeck

(57) ABSTRACT

In a method for producing a ceramic filter element for an exhaust gas filter for an internal combustion engine or a catalyst support, a combustible non-ceramic support web is used and holes or recesses are introduced into the non-ceramic support web at defined locations.

6 Claims, No Drawings

METHOD FOR PRODUCING A CERAMIC FILTER ELEMENT AND FILTER ELEMENT

CROSS REFERENCE TO RELATED APPLICATIONS

The present application is a bypass continuation application of currently pending international application No. PCT/EP2010/051636 having an international filing date of Feb. 10, 2010 and designating the United States, the international application claiming a priority date of Feb. 10, 2009 based upon prior filed German patent application No. 10 2009 008 296.4, the entire contents of the aforesaid international application and the aforesaid German patent application being incorporated herein by reference.

The present application is a continuation in part (CIP) of and claims priority to currently pending U.S. patent application Ser. No. 13/033,979 filed Feb. 24, 2011 the entire contents of U.S. patent application Ser. No. 13/033,979 incorporated herein by reference. U.S. patent application Ser. No. 13/033,979 is a continuation in part (CIP) of U.S. patent application Ser. No. 11/651,544(now U.S. Pat. No. 7,913,377) which is a continuation of international patent application no. PCT/EP2005/052884 filed Jun. 21, 2005 designating the United States of America, and published in German on Jan. 19, 2006 as WO 2006/005668 which claims priority from German patent application no. 102004033494.3 filed Jul. 10, 20046 U.S. patent application Ser. No. 13/033,979 further claims priority from U.S. patent application Ser. No. 11/945,371 filed Nov. 27, 2007 which claims priority from Federal Republic of Germany patent application no. 102006056196.1 filed Nov. 27, 2006.

The present application is a continuation in part (CIP) of and claims priority to currently pending U.S. patent application Ser. No. 12/530,153 filed Sep. 4, 2009 which is a U.S. National Stage Entry of international application PCT/EP2008/052579 filed Mar. 3, 2008 which claims priority from German patent application 10 2007 011 569.7 filed Mar. 8, 2007U.S. patent application Ser. No. 12/530,153 is incorporated herein by reference.

TECHNICAL FIELD

The invention concerns a method for producing a ceramic filter element for an exhaust gas filter of an internal combustion engine. In particular, the invention concerns a diesel particulate filter.

BACKGROUND OF THE INVENTION

Published Patent Abstracts of Japan JP 63-134 020 A discloses a ceramic filter element for an exhaust gas filter of an internal combustion engine that is comprised of a corrugated and spirally wound filter web. For producing the filter web, heat-resistant inorganic fibers are mixed with a ceramic powder in an aqueous suspension and processed to a web. Several webs stacked on each other are then wound to a desired shape of the filter body and between neighboring filter webs honeycomb-shaped flow passages are thus formed. The filter body is subsequently fired at high temperatures.

WO 2006/005668 discloses a method for producing a ceramic filter element of an exhaust gas filter for internal combustion engines. In this connection, first a combustible non-ceramic support web is impregnated with a ceramic slip or slurry and, subsequently, after having been formed to the desired shape, is fired, to such an extent that the support web is combusted and a rigid filter body remains.

A disadvantage of this method is that no cavities can be introduced in a targeted fashion into the component to be produced.

Therefore, there is a need to provide ceramic filter elements that avoid the aforementioned disadvantages of the prior art.

SUMMARY OF THE INVENTION

The invention is directed in particular to the production of ceramic filter elements as diesel particulate filter and particle filters for internal combustion engines as well as ceramic carriers for catalyst supports.

In the method preferred according to the present invention, a non-ceramic medium, for example, paper, in particular paper comprising cellulose, is first brought into shape, for example, shaped to a wound body. The wound body can comprise a flat layer and a corrugated layer. This shaped body, for example, the wound body, is then impregnated with a ceramic material, for example, a ceramic slip or slurry. The impregnated shaped body is then fired or sintered. In this connection, the organic components, for example, of the paper comprising e.g. cellulose fibers, can be removed or converted.

It is therefore an object of the present invention to provide a method for producing a ceramic filter element for an exhaust gas filter of an internal combustion engine and/or a catalyst support that enables to introduce in a targeted fashion cavities or recesses, for example, holes or slots, into the filter element.

This and further objects are solved by the method for producing a ceramic filter element for an exhaust gas filter for internal combustion engines, in particular a diesel particulate filter, wherein a combustible non-ceramic support web is used, in that holes or recesses are introduced into the non-ceramic support web at defined locations.

The object is further solved by a ceramic filter element that is characterized in that the flow passages have holes or recesses at defined locations wherein the holes or recesses are introduced before conversion into a ceramic material.

According to one method variant for producing a ceramic filter element for an exhaust gas filter for internal combustion engines, in particular a diesel particulate filter, and/or a catalyst support, wherein a combustible non-ceramic support web is used, the method comprises the following steps:
  producing a wound filter from the non-ceramic support web;
  introducing holes or recesses into the wound filter;
  subsequently impregnating the wound filter with ceramic slip;
  sintering the impregnated wound filter.

According to another method variant for producing a ceramic filter element for an exhaust gas filter for internal combustion engines, in particular a diesel particulate filter, and/or a catalyst support, wherein a combustible non-ceramic support web is used, the method comprises the following steps:
  producing a wound filter from the non-ceramic support web;
  introducing zones that reduce or prevent the absorption of liquid in the wound filter at locations where holes or recesses are to be generated in the ceramic filter element;
  subsequently impregnating the wound filter with ceramic slip;
  sintering the impregnated wound filter wherein the zones that are not impregnated with the ceramic slip are burned off so that holes or recesses are produced.

Preferably, the absorption of liquid is reduced or prevented by application of ink or liquid, for example, by means of a printer or a nozzle.

Advantageously, the absorption of liquid may also be reduced or prevented by a stronger compression of the paper web material so that the ceramic slip cannot penetrate.

Also, it is possible to reduce or prevent the absorption of liquid by thermal pretreatment, in particular of paper web material comprising a proportion of synthetic fibers.

DETAILED DESCRIPTION

Before describing in detail embodiments that are in accordance with the present invention, it should be observed that the embodiments reside primarily in combinations of apparatus components and methods related to a ceramic filter element suitable for use, among other uses, as a diesel particulate filter. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

In connection with a particle filter, in particular a diesel particulate filter, or a catalyst support, there may be the need that parts of the entire component are to be separated partially from the component or that, at a later time, for example, in connection with the desired path of exhaust gas passages, the exhaust gas flow is to be affected or influenced.

According to the invention, this is achieved in that during the manufacture of the filter element in a targeted fashion holes and/or cuts are introduced into the component. For this purpose, two options are proposed.

Firstly, the holes or cuts are introduced by a knife, a stamping tool or a pin or spike into the paper web before or after folding before or after impregnation with the ceramic slip, in particular however into the wound structure before impregnation with the ceramic slip.

Secondly, application of ink or a liquid by a printer or a nozzle at locations where holes/cuts are to be located later on in the paper web is proposed. This can be performed before or after folding or winding. Tests have shown that the ceramic slip will adhere only minimally or not at all at locations impregnated with ink or a liquid from an inkjet printer so that at these locations after sintering no ceramic will be formed. Liquid wax and adhesives that during application are liquid can also be used.

A further possibility is a stronger compression of the paper web material so that the ceramic slip cannot penetrate into the paper web at the compressed locations.

Also, by thermal pretreatment, in particular of paper web material comprising a proportion of synthetic fibers, it is possible to have the ceramic slip not adhere or adhere only minimally. This thermal pretreatment can be achieved, for example, by heated rollers or hot pressing tools.

An advantage of the method according to the invention resides in that for separation of parts of the component a sawing process must not be used because a perforation is generated where the parts can be separated from each other in a targeted fashion.

A further advantage is to be seen in that for introduction of the holes/cuts no drilling process must be performed on the sintered or hard ceramic component.

In this way, holes can be introduced in a defined position into the flow passage of a diesel particulate filter. Moreover, the method according to the invention enables introduction of holes at locations that are inaccessible otherwise.

While specific embodiments of the invention have been shown and described in detail to illustrate the inventive principles, it will be understood that the invention may be embodied otherwise without departing from such principles.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A method for producing a ceramic filter element, the method comprising:
   providing a combustible non-ceramic support web;
   winding the non-ceramic support web to produce a wound filter;
   introducing zones that reduce or prevent absorption of liquid in the wound filter at locations where holes or recesses are to be generated in the ceramic filter element;
   subsequently impregnating the wound filter with a ceramic slip;
   sintering the wound filter impregnated with the ceramic slip and burning off the zones that are not impregnated with the ceramic slip so that the zones that are burned off form the holes or recesses,
   wherein the zones that reduce or prevent the absorption of liquid are introduced by thermal pretreatment.

2. The method according to claim 1, wherein
   the non-ceramic support web is a paper web comprising a proportion of synthetic fibers.

3. A method for producing a ceramic filter element, the method comprising:
   providing a combustible non-ceramic support web;
   winding the non-ceramic support web to produce a wound filter;
   introducing zones that reduce or prevent absorption of liquid in the wound filter at locations where future holes or recesses are to be generated in the non-ceramic support web later during a sintering step;

subsequently impregnating the wound filter with a ceramic slip;

sintering the wound filter impregnated with the ceramic slip and burning off the zones that are not impregnated with the ceramic slip so that the zones that are burned off form the holes or recesses in the ceramic filter element;

wherein during the sintering step the zones are burned off to form the holes or recesses, the holes or recesses created in the wound filter impregnated with the ceramic slip during the sintering step.

4. The method according to claim 3, wherein an ink is applied to introduce the zones that reduce or prevent the absorption of ceramic slip liquid into the support web.

5. The method according to claim 4, wherein the ink is applied by a printer or a nozzle.

6. The method according to claim 3, wherein the non-ceramic support web is a paper web and the paper web is subjected to compression to introduce the zones that reduce or prevent the absorption of ceramic slip liquid into the non-ceramic support web.

* * * * *